United States Patent
Kaner et al.

(10) Patent No.: US 8,653,231 B2
(45) Date of Patent: *Feb. 18, 2014

(54) SYNTHESIS OF CONDUCTING POLYMER NANOFIBERS USING AN OLIGOMER OF A MONOMER AS AN INITIATOR

(75) Inventors: Richard B. Kaner, Pacific Palisades, CA (US); Koo Shin, Seoul (KR); Henry Hiep D. Tran, Fountain Valley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,608

(22) Filed: Dec. 22, 2011

(65) Prior Publication Data
US 2012/0091402 A1 Apr. 19, 2012

Related U.S. Application Data

(63) Continuation of application No. 11/756,215, filed on May 31, 2007, now Pat. No. 8,101,709.

(51) Int. Cl.
*C08G 73/06* (2006.01)

(52) U.S. Cl.
USPC ........... 528/423; 528/422; 528/377; 528/380; 528/370

(58) Field of Classification Search
USPC .................................. 528/380, 377, 378, 370
See application file for complete search history.

(56) References Cited

U.S. PATENT DOCUMENTS

| | | | |
|---|---|---|---|
| 4,986,886 A | 1/1991 | Wei et al. | |
| 2003/0232002 A1 | 12/2003 | Burgin | |
| 2005/0131139 A1 | 6/2005 | Kaner et al. | |
| 2006/0089489 A1 | 4/2006 | Onizuka et al. | |
| 2007/0034836 A1 | 2/2007 | Epstein et al. | |

FOREIGN PATENT DOCUMENTS

WO 2006004653 A2 1/2006

OTHER PUBLICATIONS

Cho, Gyoujin et al., "Preparation and Characterization of Polypyrrole-Coated Nanosized Novel Ceramics," Langmuir, 2001, pp. 456-461, vol. 17, American Chemical Society.

Geier III, G. Richard et al., "Meso-Substituted [34]Octaphyrin(1.1.1.0.1.1.1.0) and Corrole Formation in Reactions of a Dipyrromethanedicarbinol with 2,2'-Bipyrrole," Journal of Organic Chemistry, 2004, pp. 6404-6412, vol. 69, American Chemical Society.

Gustafsson, G. et al., "Flexible Light-Emitting Diodes Made from Soluble Conducting Polymers," Nature, Jun. 11, 1992, pp. 477-479, vol. 357, Nature Publishing Group.

(Continued)

*Primary Examiner* — Shane Fang
(74) *Attorney, Agent, or Firm* — Withrow & Terranova, P.L.L.C.

(57) ABSTRACT

The present invention involves synthesizing conducting polymer nanofibers by mixing an oxidant solution with a monomer solution, which includes a monomer and an oligomer of the monomer that is used as an initiator. The oxidant solution includes an oxidizing agent, or oxidant, such as ferric chloride to oxidize the monomer, the oligomer, or both, and begin polymerization. By including an initiator in the form of the oligomer, which may have a lower oxidation potential than the monomer, the rate of polymerization is accelerated, resulting in the nanofibrous morphology. Therefore, the conducting polymer nanofibers may be synthesized without the use of surfactants, hard templates, or seeds, resulting in a simplified and accelerated polymerization process, which enhances homogenous nucleation of the conducting polymer nanofibers.

19 Claims, 4 Drawing Sheets

(56) References Cited

OTHER PUBLICATIONS

Han, Moon Gyu et al., "1-Dimensional Structures of Poly(3,4-Ethylenedioxythiophene) (PEDOT): A Chemical Route to Tubes, Rods, Thimbles, and Belts," Chem. Commun., 2005, pp. 3092-3094, The Royal Society of Chemistry.

Huang, Jiaxing et al., "The Intrinsic Nanofibrillar Morphology of Polyaniline," Chem. Commun., 2006, pp. 367-376, The Royal Society of Chemistry.

Huang, Jiaxing et al., "Nanofiber Formation in the Chemical Polymerization of Aniline: A Mechanistic Study," Agnew. Chem. Int. Ed., 2004, pp. 5817-5821, vol. 43, Wiley-VCH Verlag GmbH & Co. KGaA, Weinheim.

Huang, Kun et al., "Multi-functional Polypyrrole Nanofibers via a Functional Dopant-introduced Process," Synthetic Metals, 2005, pp. 495-500, vol. 155, Elsevier B. V.

Jang, Jyongsik et al., "Chemical Sensors Based on Highly Conductive Poly(3,4-ethylene-dioxythiophene) Nanorods," Advanced Materials, 2005, pp. 1616-1620, vol. 17, Wiley-VCH Verlag GmbH & Co., KGaA, Weinheim.

Jang, Jyongsik et al., "A Facile Synthesis of Polypyrrole Nanotubes Using a Template-Mediated Vapor Deposition Polymerization and the Conversion to Carbon Nanotubes," Chem. Commun. 2004, pp. 882-883, The Royal Society of Chemistry.

Jang, Jyongsik et al., "Formation Mechanism of Conducting Polypyrrole Nanotubes in Reverse Micelle Systems," Langmuir, 2005, pp. 11484-11489, vol. 21, American Chemical Society.

Li, Dan et al., "Shape and Aggregation Control of Nanoparticles: Not Shaken, Not Stirred," Journal of the American Chemical Society, 2006, pp. 968-975, vol. 128, No. 3, American Chemical Society.

Li, Gang et al., "High-efficiency Solution Processable Polymer Photovoltaic Cells by Self-organization of Polymer Blends," Nature Materials, Nov. 2005, pp. 864-868, vol. 4, Nature Publishing Group.

MacDiarmid, Alan G., "'Synthetic Metals': A Novel Role for Organic Polymers," Angew. Chem. Int. Ed., 2001, pp. 2581-2590, vol. 40, Wiley-VCH Verlag GmbH, D-69451 Weinheim.

Tran, Henry D. et al., "A General Synthetic Route to Nanofibers of Polyaniline Derivatives," Chem. Commun., 2006, pp. 3915-3917, vol. 37, The Royal Society of Chemistry.

Virji, Shabnam et al., "Polyaniline Nanofiber Gas Sensors: Examination of Response Mechanisms," Nano Letters, 2004, pp. 491-496, vol. 4, No. 3, American Chemical Society.

Wei, Yen et al., "Kinetics and Activation Parameters of Electrochemical Polymerization of 3-Alkylthiophenes in the Presence of Various Aromatic Additives," J. Phys. Chem., 1993, pp. 12842-12847, vol. 97, American Chemical Society.

Wei, Yen et al., "A New Method for Polymerization of Pyrrole and Derivatives," Makromol. Chem., Rapid Commun., 1991, pp. 617-623, vol. 12, Huthig & Wepf Verlag, Basel.

Zhang, Xinyu et al., "Bulk Synthesis of Polypyrrole Nanofibers by a Seeding Approach," Journal of the American Chemical Society, 2004, pp. 12714-12715, vol. 126, American Chemical Society.

Zhang, Xinyu et al., "Chemical Synthesis of PEDOT Nanofibers," Chem. Commun., 2005, pp. 5328-5330, The Royal Society of Chemistry.

Zhang, Xuetong et al., "Controllable Synthesis of Conducting Polypyrrole Nanostructures," J. Phys. Chem. B, 2006, pp. 1158-1165, vol. 110, American Chemical Society.

Zhang, Xuetong et al., "Inorganic/Organic Mesostructure Directed Synthesis of Wire/Ribbon-like Polypyrrole Nanostructures," Chem. Commun., 2004, pp. 1852-1853, The Royal Society of Chemistry.

Notice of Allowance for U.S. Appl. No. 11/756,215, now US patent 8,101,709, mailed Sep. 26, 2011, 8 pages.

Non-final Office Action for U.S. Appl. No. 11/756,215, now US patent 8,101,709 mailed Jun. 9, 2011, 9 pages.

Final Office Action for U.S. Appl. No. 11/756,215, now US patent 8,101,709, mailed Jan. 28, 2010, 8 pages.

Non-final Office Action for U.S. Appl. No. 11/756,215, now US patent 8,101,709 mailed Nov. 19, 2010, 9 pages.

Non-final Office Action for U.S. Appl. No. 11/765,215, now US patent 8,101,709 mailed Aug. 20, 2009, 8 pages.

Roncali, J., "Conjugated Poly(thiophenes): Synthesis, functionalization and applications," Chemical Reviews, vol. 92, Mar. 1992, pp. 711-738, vol. 93, The American Chemical Society.

Walczak et al., "Poly(3, 4-alkylenedioxypyrroles): The PXDOPs as versatile yet underutilized electroactive and conducting polymers," Advanced Materials, vol. 18 No. 9, May 2006, pp. 1121-1131, Wiley-VCH Verlag GmbH & Co. KGaA, Weinheim.

SYNTHESIS OF CONDUCTING POLYMER NANOFIBERS USING AN OLIGOMER OF A MONOMER AS AN INITIATOR

PRIORITY CLAIMS

The present application claims priority to and is a continuation of U.S. application Ser. No. 11/756,215 now U.S. Pat. No. 8,101,709, filed May 31, 2007, the disclosure of which is hereby incorporated by reference in its entirety.

FIELD OF THE INVENTION

The present invention relates to the synthesis of conducting polymers, and particularly to the synthesis of conducting polymer nanofibers.

BACKGROUND OF THE INVENTION

Polymers are chemical compounds that typically have high molar masses and are composed of a large number of repeating units, called monomers. Polymers may be formed in a chemical reaction, in which a number of monomer molecules are joined sequentially to form a chain. A single type of monomer or multiple types of monomers may be used. Some polymers may be made electrically conductive by oxidation or reduction. Polymers may occur naturally or may be synthesized. Virtually all plastics are synthetic polymers. Electrically conductive plastics are used in a wide variety of applications and may reduce sizes, material and fabrication costs, and have long life in environmental conditions unfavorable for other conductive materials. The principal advantages of conducting polymers over other conducting materials are their ability to be processed and their potential ability to combine the mechanical properties of plastics, such as flexibility, toughness, etc., with the high conductivity of metals.

Nanofibers are very small fibers, typically less than one micron in diameter, and may be very strong and used in applications requiring very small dimensioned components. Conducting nanofibers may be used in electrical or electronic applications, such as photo-voltaic cells, light emitting diodes, battery electrodes, chemical sensors, super-capacitors, solar cells, battery terminals, and the like. Prior synthesis techniques include electrochemical polymerization using a scanning microneedle electrode, using a porous membrane as a template reaction, chemical polymerization in the presence of surfactants, and a vanadium pentoxide ($V_2O_5$) nanofibers seeding approach. Each of these techniques has limitations in terms of complexity, effectiveness, size of the resulting nanofibers, rate of polymerization, scalability, need for purification to remove seeds, surfactants, or templates from the nanofibers, or any combination thereof. Thus, there is a need for a synthesis technique that is simple, rapid, and produces compact homogenous conductive nanofibers without the use of surfactants, hard templates, or seeds.

SUMMARY OF THE INVENTION

The present invention involves synthesizing conducting polymer nanofibers by mixing an oxidant solution with a monomer solution, which includes a monomer and an oligomer of the monomer that is used as an initiator. The oxidant solution includes an oxidizing agent, or oxidant, such as ferric chloride to oxidize the monomer, the oligomer, or both, and begin polymerization. By including an initiator in the form of the oligomer, which may have a lower oxidation potential than the monomer, the rate of polymerization is accelerated, resulting in the nanofibrous morphology. Therefore, the conducting polymer nanofibers may be synthesized without the use of surfactants, hard templates, or seeds, resulting in a simplified and accelerated polymerization process, which enhances homogenous nucleation of the conducting polymer nanofibers. In one embodiment of the present invention, a dimer of the monomer is the oligomer. In an alternate embodiment of the present invention, a trimer of the monomer is the oligomer.

In a one embodiment of the present invention, pyrrole ($C_4H_5N$) is used as the monomer and bipyrrole is used as the oligomer to form conductive polypyrrole nanofibers. In an alternate embodiment of the present invention, thiophene ($C_4H_5S$) is used as the monomer and bithiophene is used as the oligomer to form conductive polythiophene nanofibers. In a third embodiment of the present invention, thiophene is used as the monomer and terthiophene is used as the oligomer to form conductive polythiophene nanofibers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention involves synthesizing conducting polymer nanofibers by mixing an oxidant solution with a monomer solution, which includes a monomer and an oligomer of the monomer that is used as an initiator. The oxidant solution includes an oxidizing agent, or oxidant, such as ferric chloride to oxidize the monomer, the oligomer, or both, and begin polymerization. By including an initiator in the form of the oligomer, which may have a lower oxidation potential than the monomer, the rate of polymerization is accelerated, resulting in the nanofibrous morphology. Therefore, the conducting polymer nanofibers may be synthesized without the use of surfactants, hard templates, or seeds, resulting in a simplified and accelerated polymerization process, which enhances homogenous nucleation of the conducting polymer nanofibers.

In one embodiment of the present invention, a dimer of the monomer is the oligomer. In an alternate embodiment of the present invention, a trimer of the monomer is the oligomer. An oligomer is a polymer with a relatively low number of repeating monomer units. For example, a dimer is an oligomer with two monomer units. A trimer is an oligomer with three monomer units. A tetramer is an oligomer with four monomer units. An initiator is similar to a catalyst in that both are used to increase the reaction rate of a chemical reaction, and both are typically used in small amounts relative to the reactants in the chemical reaction; however, a catalyst is not consumed during the chemical reaction, while an initiator is consumed during the chemical reaction.

Figure 1:
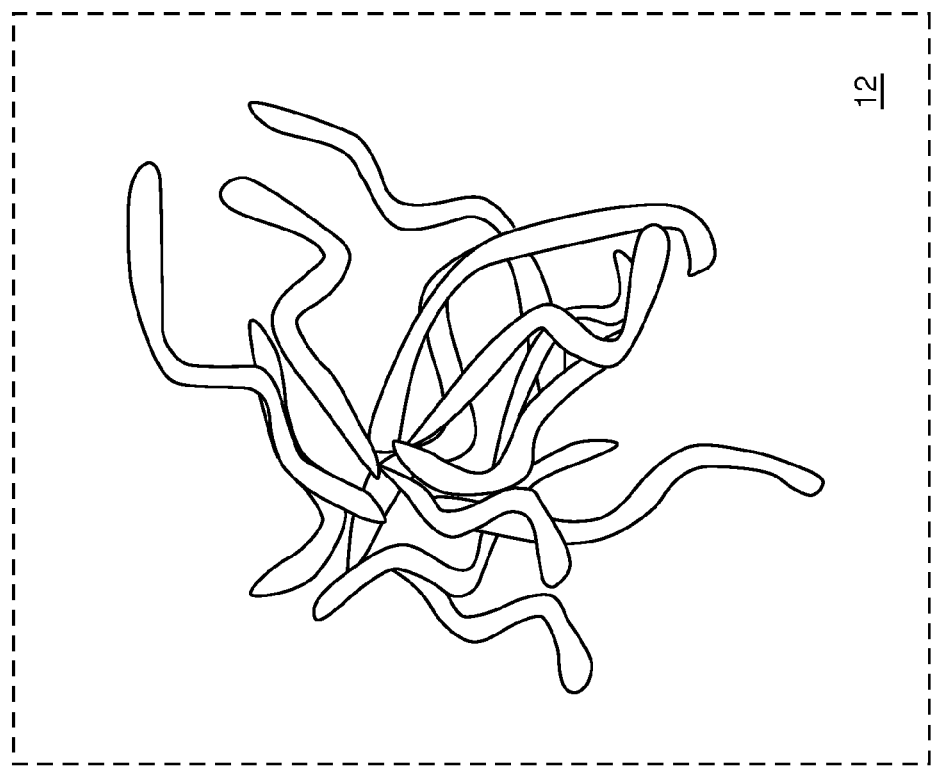
FIG. 1 shows non-oligomer initiated conducting nanofibers and oligomer initiated conducting nanofibers.
Figure 1:
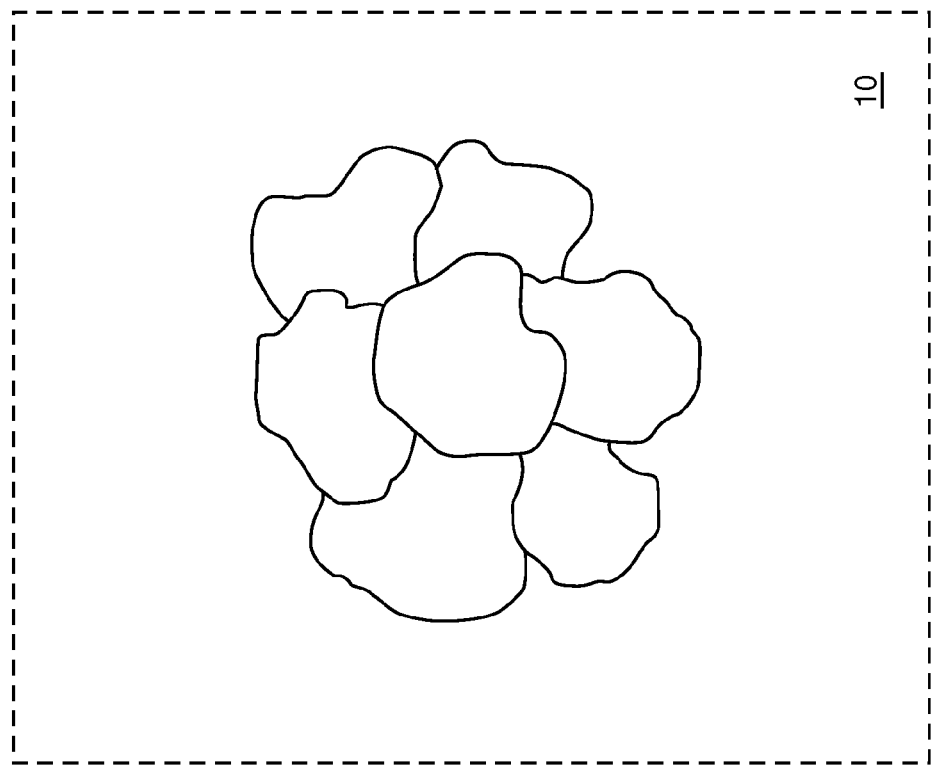

FIG. 1 shows non-oligomer initiated conducting nanofibers 10 and oligomer initiated conducting nanofibers 12. The non-oligomer initiated conducting nanofibers 10 are large granular agglomerates, resulting from a relatively slow polymerization rate. The oligomer initiated conducting nanofibers 12 were synthesized using the present invention, and are long, thin, homogenous nanofibers. Nanofibers having average diameters ranging from 10 to 15 nanometers and lengths in excess of one micrometer have been observed.

Figure 2:
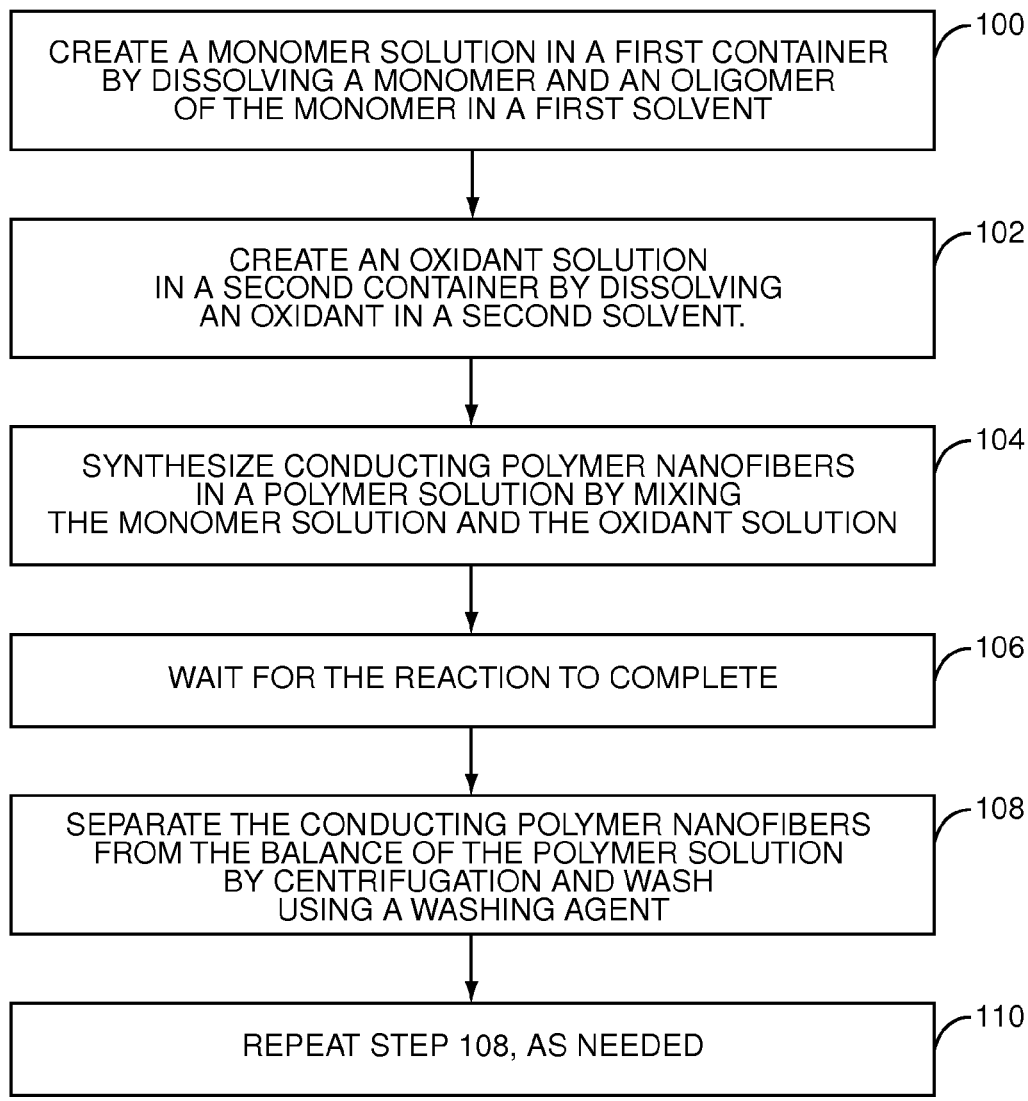
FIG. 2 shows a method for synthesizing conducting polymer nanofibers according to one embodiment of the present invention.

A method for synthesizing conducting polymer nanofibers according to one embodiment of the present invention is illustrated in FIG. 2. A monomer solution is created in a first container by dissolving a monomer and an oligomer of the monomer in a first solvent (Step 100). An oxidant solution is created in a second container by dissolving an oxidant in a second solvent (Step 102). Conducting polymer nanofibers in a polymer solution are synthesized by mixing the monomer solution and the oxidant solution (Step 104). The oligomer is used as an initiator; therefore, the monomer solution is a monomer/initiator solution. The polymer nanofibers are formed by the mixing of the monomer/initiator solution and the oxidant solution. Virtually all polymers formed using this method are nanofibers. The reaction is allowed to complete over a period of time (Step 106). The conducting polymer nanofibers are separated from the balance of the polymer solution by centrifugation and washed using a washing agent (Step 108). Since virtually all polymers formed using this method are conducting polymer nanofibers, the centrifugation and washing step may be used to separate the conducting polymer nanofibers from unreacted acid and monomers, and low molecular weight impurities. Step 108 is repeated, as needed (Step 110).

The molar concentration (M) of a substance in a solution is the number of moles of the substance in one liter of solution. A mole of a substance is $6.023 \times 10^{23}$ molecules of the substance. In one embodiment of the present invention, the molar concentration of the monomer in the monomer solution may range from approximately 0.02 M to approximately 0.2 M. The molar concentration of the oligomer in the monomer solution may range from approximately one percent to approximately twenty percent of the molar concentration of the monomer in the monomer solution. The molar concentration of the oxidant in the oxidant solution may range from approximately 0.02 M to approximately 0.2 M. During the synthesis of the conducting polymer nanofibers, a reaction temperature of the mixed solutions may range from approximately 20 degrees Celsius to approximately 60 degrees Celsius. Preferably, the oligomer is a dimer, trimer, or tetramer of the monomer. The oxidant may include molecules containing iron, molecules containing copper, or both. The first solvent may include acetonitrile ($CH_3CN$), alcohol, methanol (MeOH), ethanol (EtOH), chloroform, dichloromethane, dichlorobenzene, isopropanol, water ($H_2O$), or any combination thereof. The second solvent may include acetonitrile ($CH_3CN$), alcohol, methanol (MeOH), ethanol (EtOH), chloroform, dichloromethane, dichlorobenzene, isopropanol, water, or any combination thereof. The second solvent may be different or approximately chemically identical to the first solvent. The oxidant may include ferric chloride ($FeCl_3$), copper chloride ($CuCl_2$), iron (II) perchlorate ($Fe(ClO_4)_2$), iron (III) perchlorate ($Fe(ClO_4)_3$), ammonium peroxydisulfate (ADS), or any combination thereof. The washing agent may include acetonitrile ($CH_3CN$), alcohol, methanol (MeOH), ethanol (EtOH), isopropanol, water, or any combination thereof. A time duration of the mixing may be less than five minutes. A time duration of the waiting for the reaction to complete may be greater than one hour. In an exemplary embodiment of the present invention, a time duration for mixing may be approximately 30 seconds, while the time duration for the reaction to complete may be approximately 24 hours.

In one embodiment of the present invention, pyrrole ($C_4H_5N$) is used as the monomer and bipyrrole is used as the oligomer to form conductive polypyrrole nanofibers, which may be highly electrically conductive and environmentally stable. In an alternate embodiment of the present invention, a chemical variant of pyrrole may be used as the monomer and an oligomer of the chemical variant of pyrrole may be used as the initiator. Chemical variants of pyrrole may include, but are not limited to, N-methylpyrrole; alkylpyrroles, such as methylpyrrole or ethylpyrrole; alkoxy pyrroles, such as methoxy pyrrole or ethoxy pyrrole; or any chemical variants of pyrrole, such as those referenced in an article by R. M. Walczak and J. R. Reynolds entitled "Poly(3,4-alkylenedioxypyrroles): The PXDOPs as Versatile Yet Underutilized Electroactive and Conducting Polymers" in a trade publication titled Advanced Materials, Volume 18, Issue 9, Pages 1121-1131, 2006, which is incorporated herein by reference in its entirety.

Figure 3:
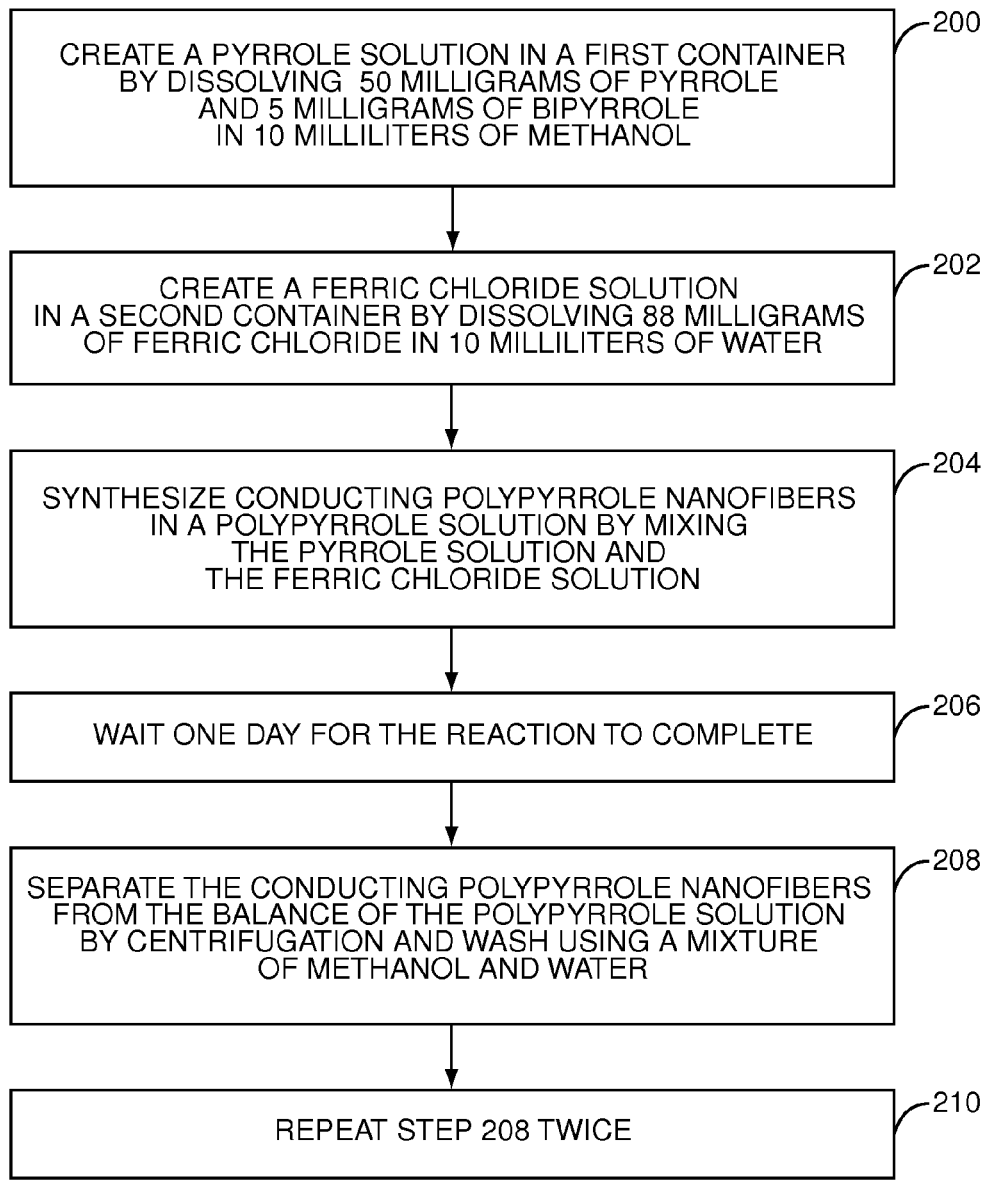
FIG. 3 shows a method for synthesizing conducting polypyrrole nanofibers according to an alternate embodiment of the present invention.

Pyrrole ($C_4H_5N$) is a monomer and a heterocyclic aromatic organic compound having a ring structure with five members. Polypyrrole is a polymer formed from a number of connected pyrrole ring structures and can be made conductive by oxidation. Bipyrrole is a dimer of pyrrole and has two pyrrole rings connected together. A method for synthesizing conducting polypyrrole nanofibers according to one embodiment of the present invention is illustrated in FIG. 3. A pyrrole solution is created in a first container by dissolving 50 milligrams of pyrrole and 5 milligrams of bipyrrole in 10 milliliters of methanol (Step 200). A ferric chloride solution is created in a second container by dissolving 88 milligrams of ferric chloride in 10 milliliters of water (Step 202). Conducting polypyrrole nanofibers in a polypyrrole solution are synthesized by mixing the pyrrole solution and the ferric chloride solution (Step 204). Bipyrrole is used as an initiator. The pyrrole solution and the ferric chloride solution may be rapidly mixed for approximately 30 seconds. The reaction is allowed to complete by waiting for one day (Step 206). The conducting polypyrrole nanofibers are separated from the balance of the polypyrrole solution by centrifugation and washed using a mixture of methanol and water (Step 208). Since virtually all polymers formed using this method are conducting polypyrrole nanofibers, the centrifugation and washing step may be used to separate the conducting polypyrrole nanofibers from unreacted acid and pyrrole, and low molecular weight impurities. Step 208 is repeated twice (Step 210).

In an alternate embodiment of the present invention, thiophene ($C_4H_5S$) is used as the monomer and bithiophene is used as the oligomer to form conductive polythiophene nanofibers, which may be highly electrically conductive and environmentally stable. In a third embodiment of the present invention, thiophene is used as the monomer and terthiophene is used as the oligomer to form conductive polythiophene nanofibers. In an alternate embodiment of the present invention, a chemical variant of thiophene may be used as the monomer and an oligomer of the chemical variant of thiophene may be used as the initiator. Chemical variants of thiophene may include, but are not limited to, alkylthiophenes such as methylthiophene or ethylthiophene, alkoxythiophenes such as ethylenedioxythiophene or ethoxythiophene, other substituted thiophenes, or any chemical variants of thiophene, such as those referenced in an article by Jean Roncali entitled "Conjugated Poly(thiophenes): Synthesis, Functionalization, and Applications" in a trade journal titled Chemical Reviews, Volume 92, Pages 711-738, 1992, which is incorporated herein by reference in its entirety.

Figure 4:
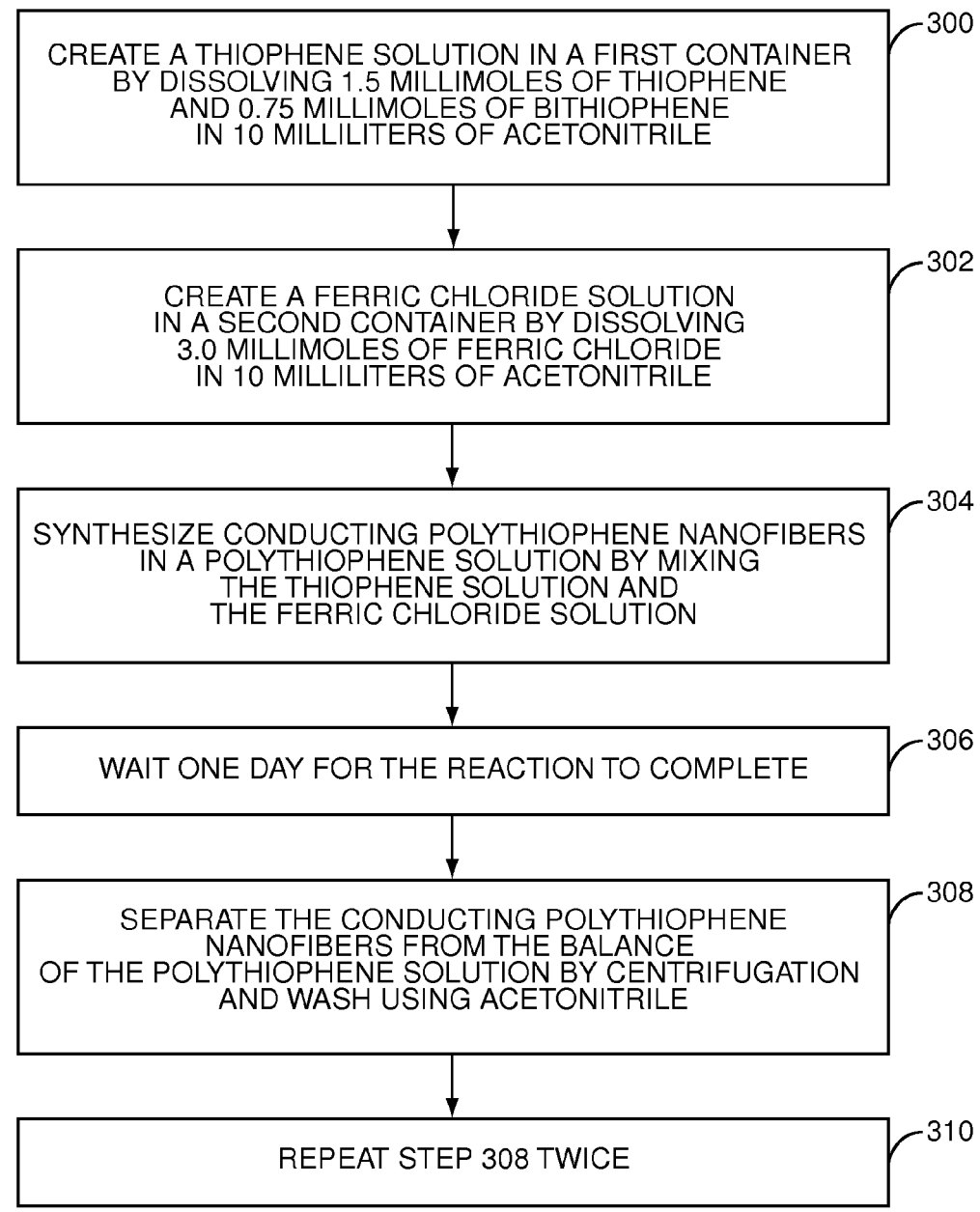
FIG. 4 shows a method for synthesizing conducting polythiophene nanofibers according to an additional embodiment of the present invention.

Thiophene ($C_4H_5S$) is a monomer and a sulfur-based heterocyclic aromatic organic compound having a ring structure with five members. Polythiophene is a polymer formed from a number of connected thiophene ring structures and can be made conductive by oxidation. Bithiophene is a dimer of thiophene and has two thiophene rings connected together. Terthiophene is a trimer of thiophene and has three thiophene rings connected together. A method for synthesizing conducting polythiophene nanofibers according to the one embodiment of the present invention is illustrated in FIG. 4. A thiophene solution is created in a first container by dissolving 1.5 millimoles of thiophene and 0.75 millimoles of bithiophene in 10 milliliters of acetonitrile (Step 300). A ferric chloride solution is created in a second container by dissolving 3.0 millimoles of ferric chloride in 10 milliliters of acetonitrile (Step 302). Conducting polythiophene nanofibers in a polythiophene solution are synthesized by mixing the thiophene solution and the ferric chloride solution (Step 304). Bithiophene is used as an initiator. The thiophene solution and the ferric chloride solution may be rapidly mixed for approximately 30 seconds. The reaction is allowed to complete by waiting for one day (Step 306). The conducting polythiophene nanofibers are separated from the balance of the polythiophene solution by centrifugation and washed using acetonitrile (Step 308). Since virtually all polymers formed using this method are conducting polythiophene nanofibers, the centrifugation and washing step may be used to separate the conducting polythiophene nanofibers from unreacted acid and thiophene, and low molecular weight impurities. Step 308 is repeated twice (Step 310).

Those skilled in the art will recognize improvements and modifications to the preferred embodiments of the present invention. In particular, the compounds and process techniques may be varied based on environmental conditions and desired properties or quantities. All such improvements and modifications are considered within the scope of the concepts disclosed herein and the claims that follow.

What is claimed is:

1. A method comprising:
   providing a monomer, a dimer of the monomer, an oxidant, and at least one solvent, wherein the dimer of the monomer is bypyrrole; and
   mixing the monomer, the dimer, the oxidant, and the at least one solvent for less than 5 minutes to create a polymer solution comprising dimer initiated conducting nanofibers of the monomer.

2. The method of claim 1 further comprising separating the dimer initiated conducting nanofibers from a remainder of the polymer solution.

3. The method of claim 1 further comprising separating the dimer initiated conducting nanofibers from a balance of the polymer solution using centrifugation and washing using a washing agent.

4. The method of claim 3 wherein the washing agent comprises at least one selected from a group consisting of acetonitrile ($CH_3CN$), alcohol, methanol (MeOH), ethanol (EtOH), isopropanol, and water ($H_2O$).

5. The method of claim 1 further comprising providing reaction time by waiting after the mixing to create the polymer solution.

6. The method of claim 5 wherein the reaction time is greater than about one hour.

7. The method of claim 1 wherein the mixing further comprises:
   dissolving the monomer and the dimer in a first solvent to create a monomer solution;
   dissolving the oxidant in a second solvent to create an oxidant solution; and
   mixing the monomer solution and the oxidant solution to create the polymer solution, such that the at least one solvent comprises the first solvent and the second solvent.

8. The method of claim 7 wherein the first solvent comprises at least one selected from a group consisting of acetonitrile ($CH_3CN$), alcohol, methanol (MeOH), ethanol (EtOH), chloroform, dichloromethane, dichlorobenzene, isopropanol, and water ($H_2O$).

9. The method of claim 7 wherein the second solvent comprises at least one selected from a group consisting of acetonitrile ($CH_3CN$), alcohol, methanol (MeOH), ethanol (EtOH), chloroform, dichloromethane, dichlorobenzene, isopropanol, and water ($H_2O$).

10. The method of claim 7 wherein the second solvent is approximately chemically identical to the first solvent.

11. The method of claim 7 wherein a first molar concentration (M) of the monomer in the monomer solution is between approximately 0.02 M and approximately 0.2 M.

12. The method of claim 11 wherein a second molar concentration of the dimer in the monomer solution is between approximately one percent and approximately twenty percent of the first molar concentration.

13. The method of claim 7 wherein a first molar concentration (M) of the oxidant in the oxidant solution is between approximately 0.02 M and approximately 0.2 M.

14. The method of claim 7 wherein the dimer is an initiator.

15. The method of claim 1 wherein the oxidant comprises at least one selected from a group consisting of molecules containing iron and molecules containing copper.

16. The method of claim 1 wherein the oxidant further comprises at least one selected from a group consisting of ferric chloride ($FeCl_3$), copper chloride ($CuCl_2$), iron (II) perchlorate ($Fe(ClO_4)_2$), iron (III) perchlorate ($Fe(ClO_4)_3$), and ammonium peroxydisulfate (ADS).

17. The method of claim 1 further comprising a reaction temperature range between approximately 20 degrees Celsius and approximately 60 degrees Celsius.

18. The method of claim 1 wherein the monomer comprises one selected from a group consisting of pyrrole ($C_4H_5N$) and a chemical variant of pyrrole.

19. The method of claim 1 wherein the mixing the monomer, the dimer, the oxidant, and the at least one solvent is on the order of about 30 seconds.

* * * * *